(12) United States Patent
Dumont

(10) Patent No.: US 8,820,832 B2
(45) Date of Patent: Sep. 2, 2014

(54) ACTIVE HEAD RESTRAINT WITH WIRING PASS-THROUGH

(75) Inventor: Jeffrey Dumont, Royal Oak, MI (US)

(73) Assignee: Nissan North America, Inc., Franklin, TN (US)

( * ) Notice: Subject to any disclaimer, the term of this patent is extended or adjusted under 35 U.S.C. 154(b) by 350 days.

(21) Appl. No.: 13/301,929

(22) Filed: Nov. 22, 2011

(65) Prior Publication Data

US 2013/0127215 A1    May 23, 2013

(51) Int. Cl.
  *A47C 1/036*  (2006.01)
  *A47C 7/38*  (2006.01)
  *B60R 11/02*  (2006.01)
  *B60N 2/60*  (2006.01)
  *B60N 2/48*  (2006.01)
  *B60R 11/00*  (2006.01)
  *B60N 2/02*  (2006.01)

(52) U.S. Cl.
  CPC ....... *B60N 2/4876* (2013.01); *B60R 2011/0017* (2013.01); *B60R 11/0235* (2013.01); *B60N 2/6009* (2013.01); *B60N 2/4885* (2013.01); *B60N 2002/0264* (2013.01)
  USPC ........................................ 297/217.3; 297/408

(58) Field of Classification Search
  USPC .......................... 297/216.12, 217.3, 408, 410
  See application file for complete search history.

(56) References Cited

U.S. PATENT DOCUMENTS

| 5,080,437 | A  | 1/1992  | Pesta et al. |
| 6,074,011 | A  | 6/2000  | Ptak et al. |
| 6,702,377 | B2 * | 3/2004  | Nakano .................... 297/216.12 |
| 6,742,846 | B1 | 6/2004  | Isaacson |
| 7,121,625 | B2 * | 10/2006 | Malsch et al. ................ 297/410 |
| 7,360,833 | B2 | 4/2008  | Vitito |
| 7,416,439 | B2 | 8/2008  | Macholz |
| 7,448,679 | B2 | 11/2008 | Chang |
| 7,533,452 | B1 | 5/2009  | Espina et al. |
| 7,591,508 | B2 | 9/2009  | Chang |
| 7,621,598 | B2 | 11/2009 | Humer et al. |
| 7,636,930 | B2 | 12/2009 | Chang |
| 7,637,565 | B2 | 12/2009 | Kuno et al. |
| 7,758,117 | B2 | 7/2010  | Chang |
| 7,762,627 | B2 | 7/2010  | Chang |

(Continued)

FOREIGN PATENT DOCUMENTS

| JP | 2008099782 A | 5/2008 |
| WO | 9947381 | 9/1999 |
| WO | 2007108271 | 9/2007 |
| WO | 2008125747 A2 | 10/2008 |

*Primary Examiner* — David R Dunn
*Assistant Examiner* — Timothy J Brindley
(74) *Attorney, Agent, or Firm* — Young, Basile, Hanlon & MacFarlane, P.C.

(57) ABSTRACT

Disclosed herein are embodiments of a wire harness assembly for routing a wire harness through a vehicle seat back having an active head restraint system. The assembly can comprise a movable member configured to move relative to a seat frame in a vehicle fore-aft direction and can have a sleeve with a first end configured to receive a headrest. A harness guide is included with a guide tube and an attachment member that is connected to the guide tube and to the movable member, the guide tube having a first open end and a second open, and a guide passage that extends through the guide tube from the first open end to the second open end. A second end of the sleeve opposite the first end is located within the attachment member and configured such that the sleeve and the attachment member move with the movable member.

20 Claims, 9 Drawing Sheets

(56) References Cited

U.S. PATENT DOCUMENTS

| | | |
|---|---|---|
| 7,812,784 B2 | 10/2010 | Chang |
| 8,348,338 B2 * | 1/2013 | Galecka et al. .......... 297/216.12 |
| 2003/0111889 A1 | 6/2003 | Meshke et al. |
| 2003/0222491 A1 | 12/2003 | Isaacson |
| 2005/0099042 A1 | 5/2005 | Vitito |
| 2008/0165293 A1 | 7/2008 | Tranchina |
| 2008/0217971 A1 * | 9/2008 | Paluch .................... 297/216.12 |
| 2009/0085383 A1 | 4/2009 | Hicks et al. |
| 2009/0179468 A1 * | 7/2009 | Orzelski et al. .......... 297/216.12 |
| 2010/0164271 A1 | 7/2010 | Song |
| 2012/0161481 A1 * | 6/2012 | Tache et al. ................ 297/217.3 |

* cited by examiner

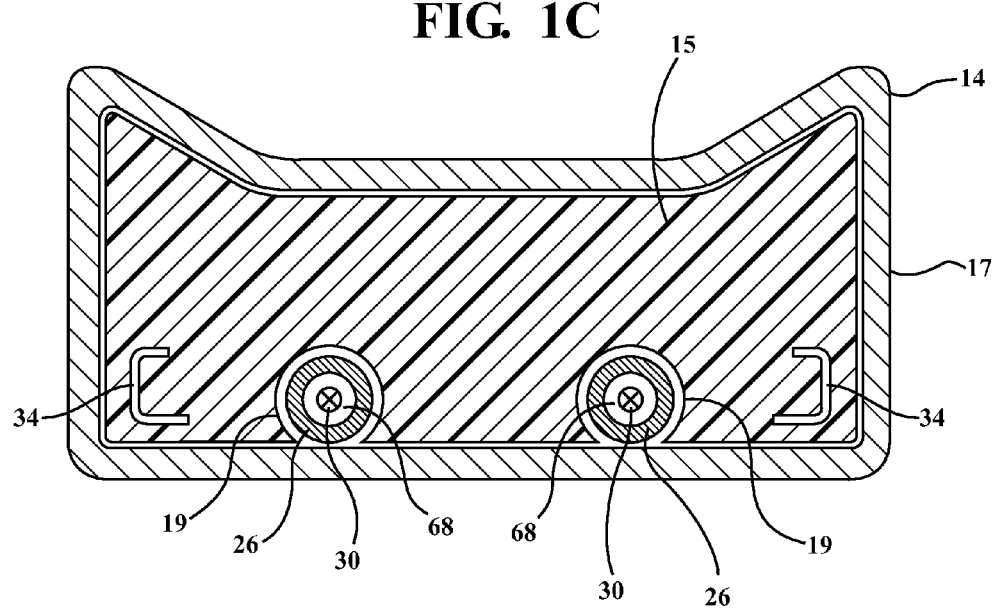

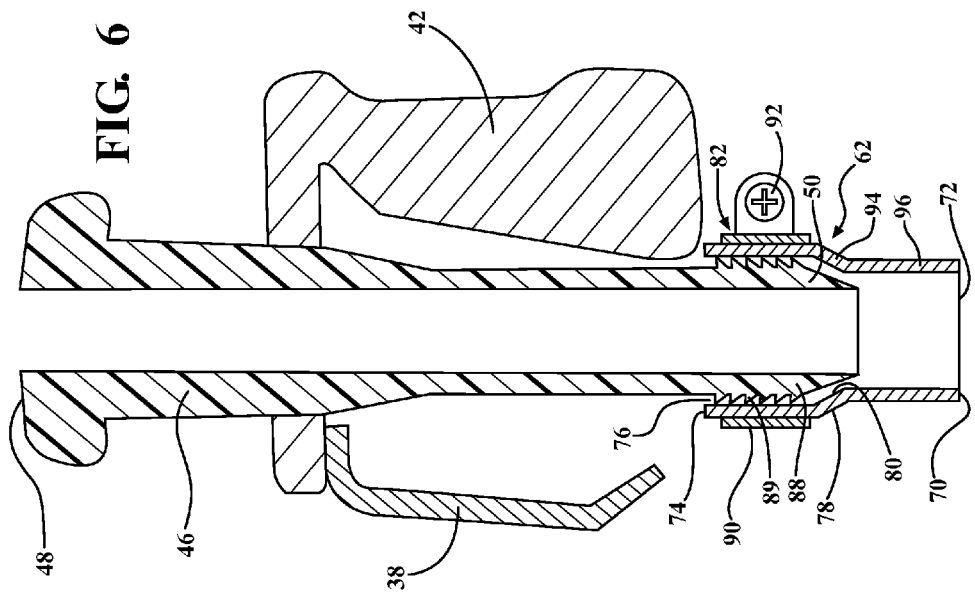
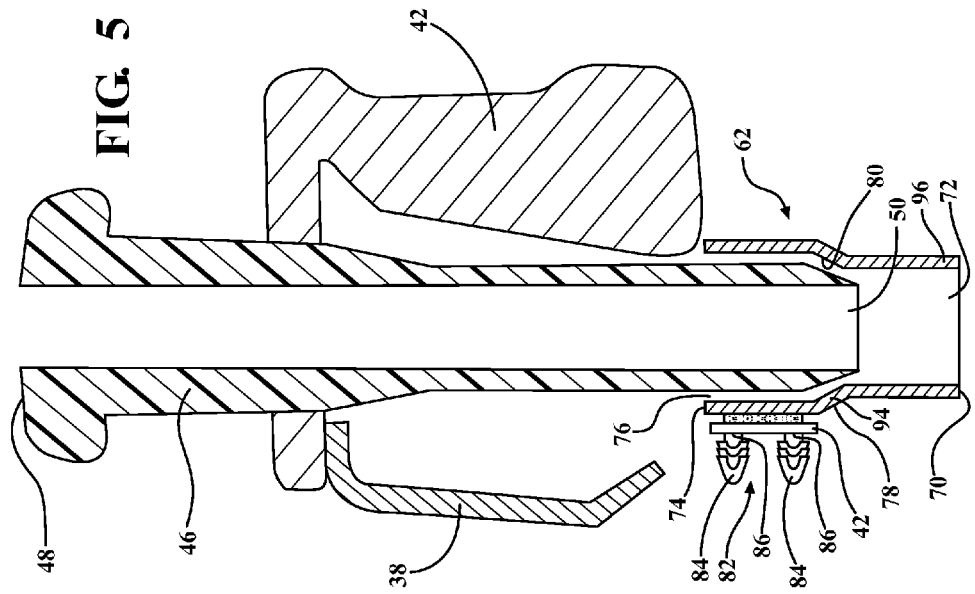

ACTIVE HEAD RESTRAINT WITH WIRING PASS-THROUGH

FIELD OF THE INVENTION

The invention relates to the field of wire harnesses for motor vehicle seats, and more particularly, to a guide assembly for routing a headrest wire harness.

BACKGROUND OF THE INVENTION

In passenger vehicles, it has become commonplace to install electrical components within the headrests of the vehicle seats. By way of example, electrical components such as motorized assemblies for changing the position of the headrest or audio/visual displays may be installed in the headrest. Thus, automobile designers have been tasked with providing an electrical connection between the headrest and the electrical system of the vehicle. This is typically accomplished by routing a headrest wire harness through the seat to which the headrest is attached.

Many vehicle seats are being equipped with active head restraints, with the head rest guides on a moving portion of the vehicle seat. The use of active head restraints can present additional challenges to routing the headrest wire harness through the seat. In light of the foregoing, the need remains for a structure that is capable of routing a wire harness past a movable portion of the seat and through the remainder of the vehicle seat subsequent to installation of the seat cover without disturbing the seat cover.

SUMMARY

Wire harness assemblies for routing a wire harness through a vehicle seat back having an active head restraint system are taught herein. One embodiment of a wire harness assembly comprises a movable member configured to move relative to a seat frame in a vehicle fore-aft direction. The movable member has a sleeve with a first end configured to receive a headrest rod of the active head restraint system. A harness guide includes a guide tube and an attachment member that is connected to the guide tube and to the movable member. The guide tube has a first open end and a second open end that is spaced apart from the first open end, and a guide passage that extends through the guide tube from the first open end to the second open end. A second end of the sleeve opposite the first end is located within the attachment member and configured such that the sleeve and the attachment member move with the movable member.

Also disclosed herein are seat assemblies for vehicles. One seat assembly for a vehicle taught herein comprises a frame having an upper end and a lower end, a seat back supported by the frame, and a headrest. The headrest has a headrest rod that supports the headrest with respect to the seat back, with a first end of the headrest rod disposed within the headrest, and a second end of the headrest rod disposed outside the headrest and receivable within the seat back at the upper end of the frame. An electrical component is disposed within the headrest and has a wire harness extending from the electrical component through the headrest rod. A movable member is coupled to the upper end of the frame, the movable member configured to move relative to the frame in a fore-aft direction of the vehicle. A sleeve is coupled to the movable member with a first end configured to receive the headrest rod and a second end opposite the first end. A harness guide includes a guide tube and an attachment member that is connected to the guide tube and to the movable member, the guide tube having a first open end and a second open end that is spaced apart from the first open end, and a guide passage that extends through the guide tube from the first open end to the second open end. When received in the seat back, the second end of the headrest rod is located within the guide tube past the attachment member such that the headrest rod and the attachment member move with the movable member, with the wire harness exiting the second end of the headrest rod within the guide tube and extending through the guide passage of the guide tube through the second open end.

BRIEF DESCRIPTION OF THE DRAWINGS

The description herein makes reference to the accompanying drawings wherein like reference numerals refer to like parts throughout the several views, and wherein:

FIG. 1C is a sectional view of a seat back of the vehicle seat showing the position of the guide tube with respect to a foam structure of the seat back;

FIG. 5 is an enlarged view of a part of the wire harness assembly disclosed herein;

FIG. 6 is an enlarged view of another embodiment of the wire harness assembly disclosed herein;

DETAILED DESCRIPTION

Figure 1A:
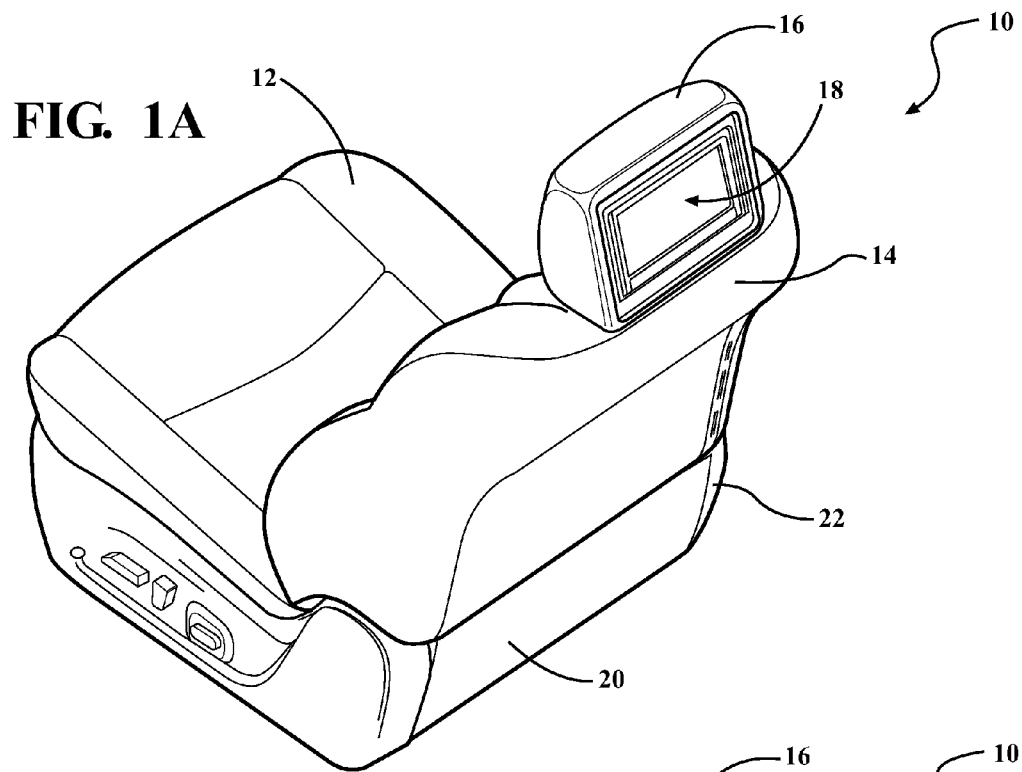
FIG. 1A is a perspective view showing a vehicle seat incorporating a wiring harness assembly according to an embodiment disclosed herein with a toe kick plate installed to conceal the wire harness.

FIG. 1A illustrates a vehicle seat 10 having a seat bottom 12 and a seat back 14. A headrest 16 is supported by the seat back 14, and an electrical component 18 is disposed within the headrest 16. The electrical component 18 may be any manner of device, including, but not limited to, an audio/visual display. A toe kick plate 20 may be installed with respect to the seat back 14 and/or the seat bottom 12 covering the bottom end 22 of the seatback 14.

Figure 1B:
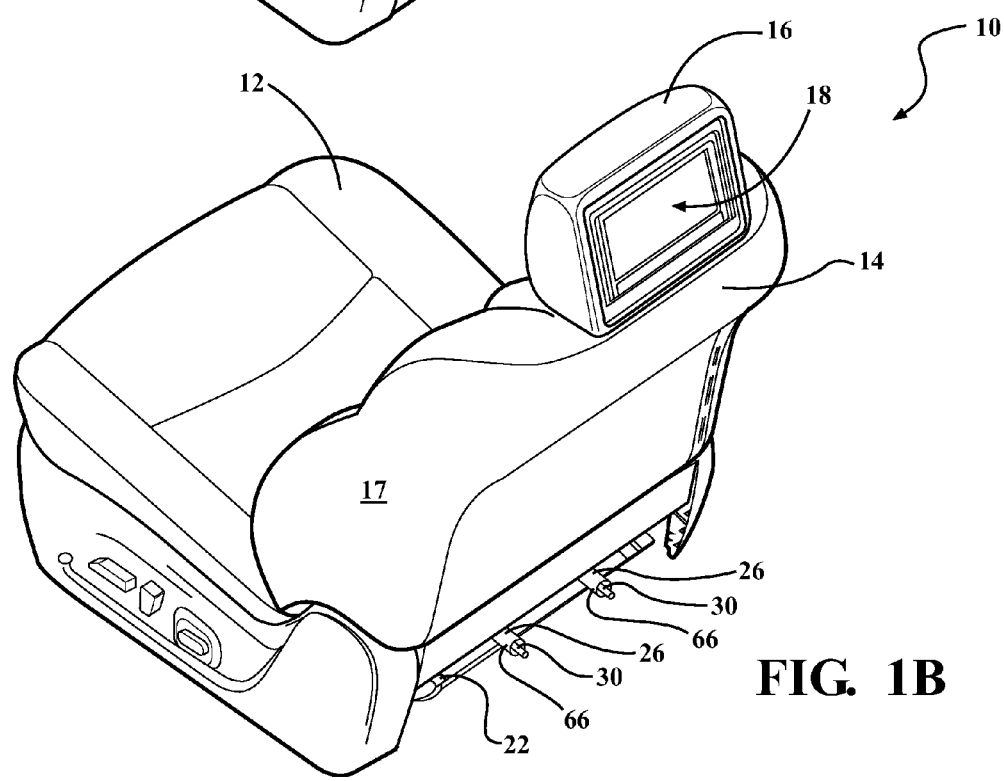
FIG. 1B is a perspective view showing the vehicle seat of FIG. 1A with the toe kick plate removed.
Figure 2A:
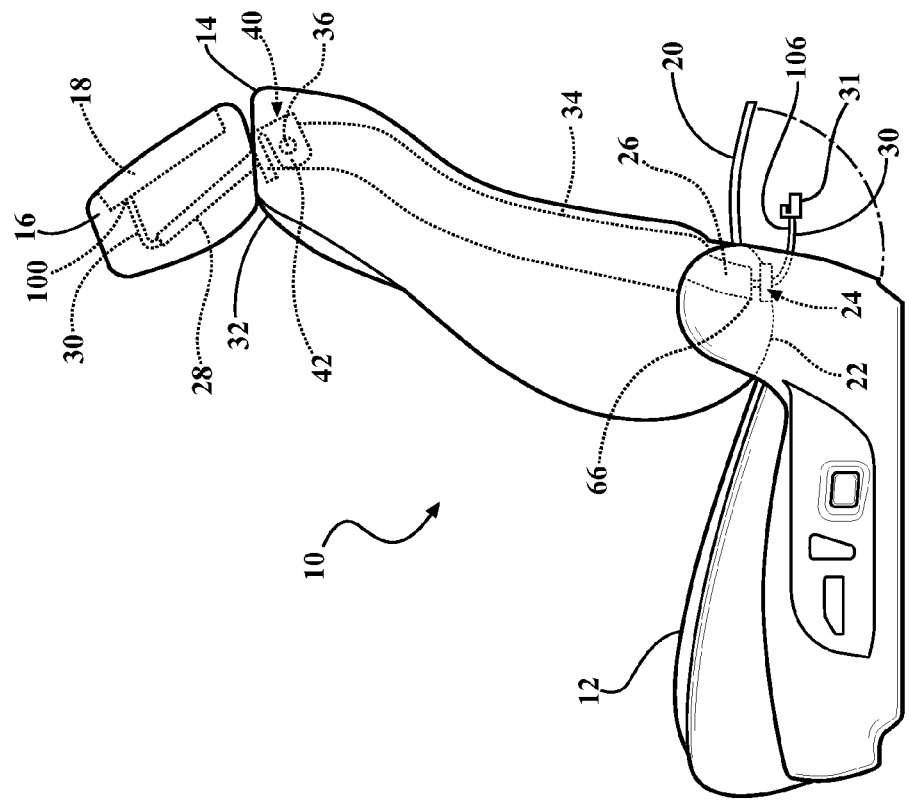
FIG. 2A is a side view of the vehicle seat of FIG. 1A, wherein the toe kick plate is in an open position and a headrest is in a neutral position.

FIG. 1B illustrates the vehicle seat 10 of FIG. 1A with the toe kick plate 20 removed to expose an exit aperture 24, seen in FIG. 2A. One or more guide tubes 26 extend through the exit aperture 24, each guide tube 26 guiding a wire harness 30 through the seat back 14.

As shown in FIG. 1C, the seat back 14 includes a foam structure 15 that is supported by a frame 34 of the seat back 14. The foam structure 15 is adapted to support the weight of a passenger of the seat 10 and is retained within a seat cover 17 of the seat back 14. To provide clearance for the guide tube 26 of the wire harness assembly 40, the foam structure 15 has a receiving portion 19 formed therein. The receiving portion 19 may be a trough, passageway, or other manner of cavity that is formed through the foam structure 15 of the seat back 14. The guide tube 26 is received within the receiving portion 19.

Figure 2B:
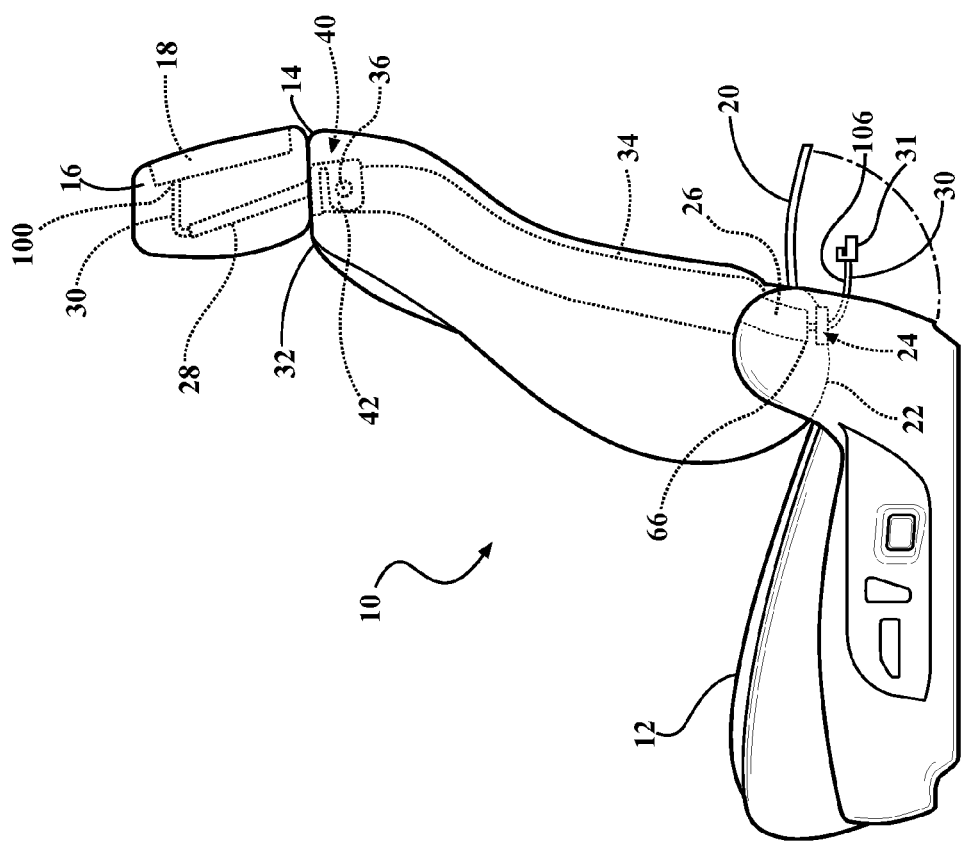
FIG. 2B is a side view of the vehicle seat of FIG. 1A, wherein the toe kick plate is in the open position and the headrest is in a forward position.

As shown in FIG. 2A, the headrest 16 includes a headrest rod 28 that is received by the seat back 14 at a top end 32 thereof. At the top end 32 of the seat back 14 is a wire harness assembly 40 having a movable member 42 that is pivotally attached to the seat frame 34 of the seat back 14 at a pivot point 36. The movable member 42 moves relative to the seat frame 34 in a vehicle fore-aft direction, moving the headrest 16 with it. In FIG. 2A, the wire harness assembly 40 is in a neutral position such that the head rest 16 is in a typical operational position. In FIG. 2B, the wire harness assembly 40 in a forward position, which will be explained in more detail herein.

The wire harness assembly 40 extends through the seat back 14 from the headrest rod 28 to the exit aperture 24 that is positioned at the bottom end 22 of the seat back 14. The wire harness 30 is disposed at least partially within the wire harness assembly 40. Thus, the wire harness 30 is routed through the seat back 14 from the headrest 16 to the exit aperture 24 by the wire harness assembly 40. The toe kick plate 20 protects the wire harness 30 from interference by an occupant or objects within the vehicle. The toe kick plate 20 can be connected to a portion of the vehicle seat 10 using a J-hook (not shown) or other suitable structure that is configured to engage a portion of the vehicle seat 10 and be releasable with respect to the vehicle seat 10 to allow access to the wire harness 30, as shown in FIGS. 2A-2B.

Figure 3:
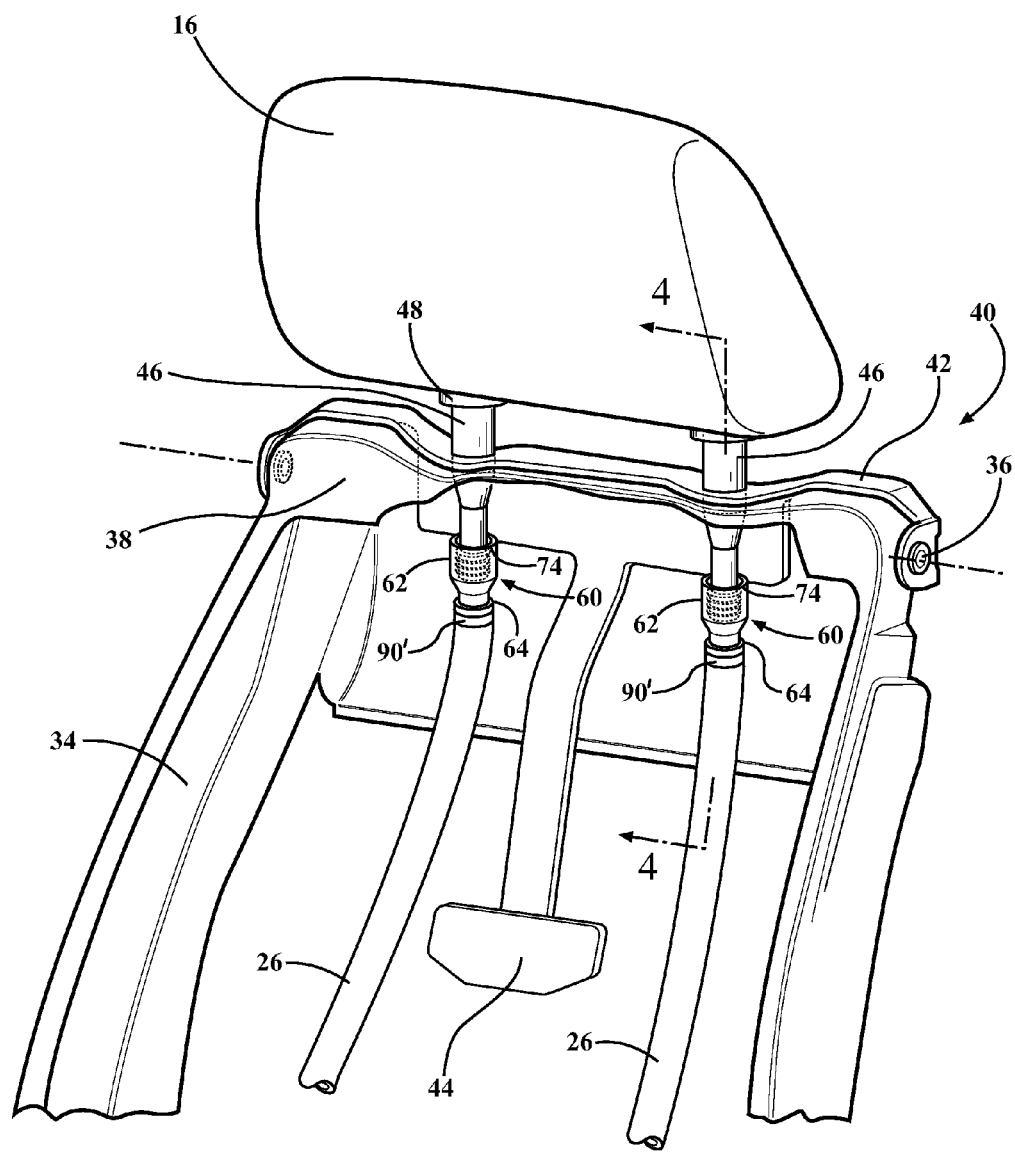
FIG. 3 is a perspective view of the upper seat frame of the vehicle seat showing connection of the movable member to the seat frame.

FIG. 3 shows the vehicle seat 10 with the seatback 14 material removed from the seat frame 34 to illustrate the relationship between the wire harness assembly 40 and the seat frame 34. The seat frame 34 has an upper member 38 extending along the top end 32 of the seat back 14. The movable member 42 is movably attached to this upper member 38 of the seat frame 34. Extending from the movable member 42 is a paddle 44. The paddle 44 extends from the movable member 42 and moves the movable member 42 when sufficient force is placed on the paddle 44 through the seat back 14 by the passenger in the seat. For example, when a force is exerted on the vehicle in the fore-aft direction, the force moves the passenger in the fore-aft direction as well. As the passenger moves aft, the passengers weight presses against the paddle 44, moving the paddle 44 aft. The movement of the paddle 44 in the rearward direction forces the movable member 42, along with the head rest 16, in the forward direction, stabilizing the passenger's head and neck.

Figure 4:
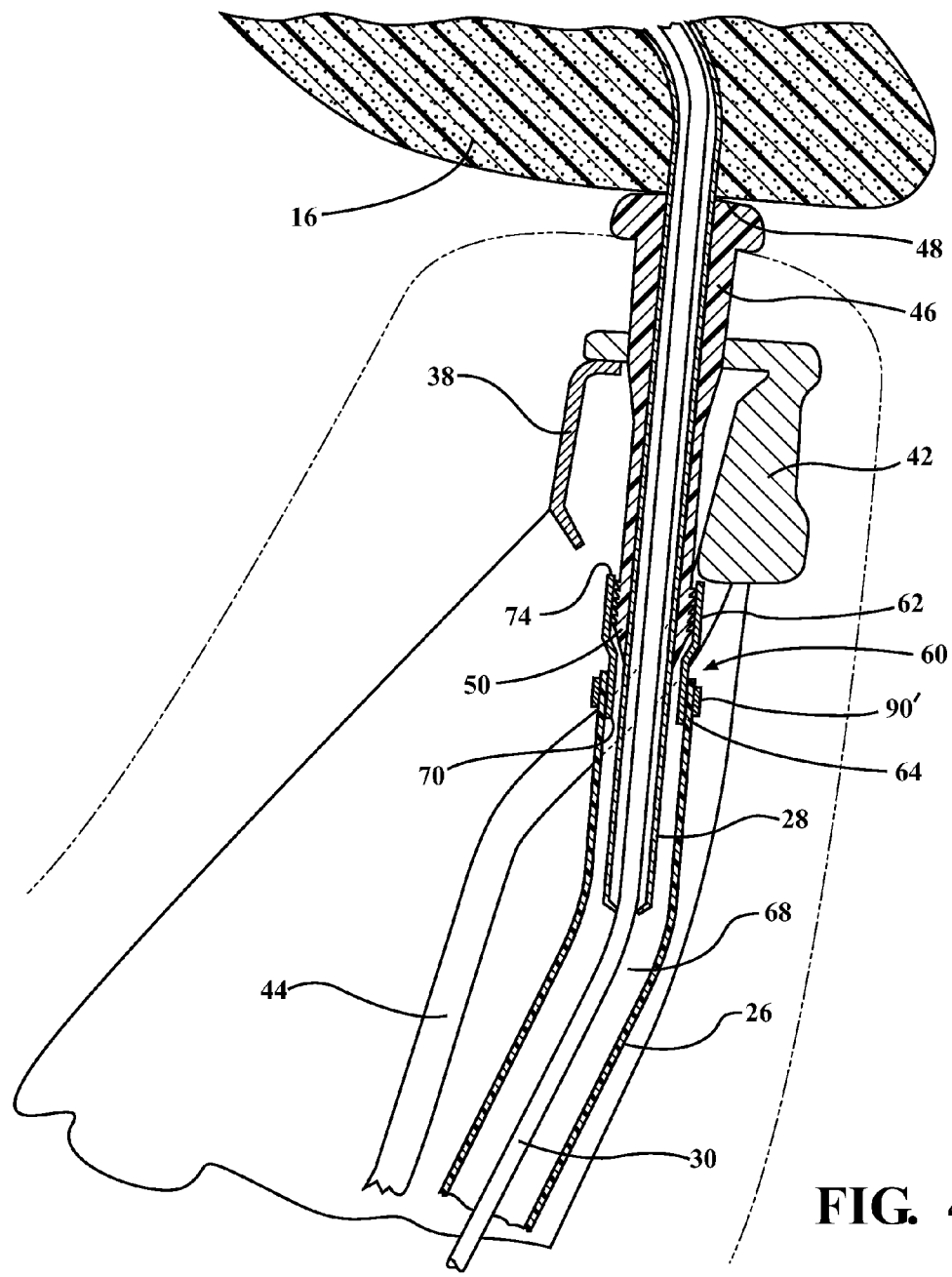
FIG. 4 is a cross sectional view of FIG. 3 along line 4-4.

FIG. 4 is a cross-sectional view of FIG. 3 along line 4-4. The movable member 42 of the wire harness assembly 40 has a sleeve 46 with a first end 48 configured to receive the headrest rod 28. The sleeve 46 extends through aligned openings in the movable member 42 and the upper member 38 of the seat frame 34, with the second end 50 of the sleeve 46 located in the seat back 14 below the upper member 38 of the seat frame 34. The head rest rod 28 extends through the sleeve 46 into the seat back 14 beyond the second end 50 of the sleeve 46. The headrest rods 28 support the headrest 16 with respect to the seat back 14 such that it is moveable with respect to the seat back 14. The headrest rods 28 can also be connected to the sleeve 46 such that the headrest rods 28 are slidably movable in the sleeve 46 to raise and lower the head rest 16 with respect to the seat back 14.

A harness guide 60 includes the guide tube 26 and an attachment member 62 that is connected to the guide tube 26 and to the movable member 42. The figures illustrate the use of two harness guides 60 by way of example. However, it is contemplated that only one harness guide 60 may be necessary depending on the number of wire harnesses 30 that need routing from the head rest 16 through the seat back 14. The guide tube 26 has a first open end 64 and a second open end 66 (shown in FIGS. 1B, 2A and 2B) that is spaced apart from the first open end 64. An internal guide passage 68 extends through the guide tube 26 from the first open end 64 to the second open end 66. The guide tube 26 can be coupled to the seat frame 34 at one or more places along the seat frame 34 if a receiving portion 19 in the foam structure 15 is not utilized. At least a portion of the guide tube 26 is a flexible material. The flexible material may be capable of stretching and shrinking back to its original shape. The flexible material should have sufficient rigidity to allow for threading of the wire harness 30 through the guide tube 26 without the wire harness 30 becoming obstructed.

The attachment member 62 has a first end 70 attached to the first open end 64 of the guide tube 26 with a first opening 72 in communication with the first open end 64 of the guide tube 26. A second end 74 of the attachment member 62 has a second opening 76 configured to receive the second end 50 of the sleeve 46. The second opening 76 is larger than the first opening 72. However, the first and second openings 72, 76 can be the same size, or the first opening 72 can be larger than the second opening 76, depending on the design requirements of the seat elements.

FIGS. 5 and 6 are enlarged views of the sleeve 46, movable member 42 and attachment member 62. The attachment member 62 has an exterior wall 78 and an interior wall 80. The attachment member 62 can mount directly to the movable member 42. As shown in FIG. 5, the exterior wall 78 of the attachment member 62 can have a mounting structure 82 configured to attach the attachment member 62 to the movable member 42. As a non-limiting example, the attachment structure can have one or more projections 84 extending from the exterior wall 78. The movable member 42 can define respective mounting apertures 86, with each of the projections 84 configured to be received in a respective mounting aperture 86 in the movable member 42. The projections 84 are adapted to extend through the mounting apertures 86 of the movable member 42. For example, the projections 84 may be somewhat resilient members that are capable of compressing or deflecting slightly toward their centers upon contact with the perimeter of the respective mounting aperture 86 until the projections 84 pass through their respective mounting aperture 86. The projections 84 may then expand or return from their deflected position once they have passed through the mounting aperture 86 in order to secure the attachment member 62 to the movable member 42. With this configuration, the projections 84 are configured to resist removal from the mounting apertures 86 absent compression or deflection of the projections 84.

The attachment member 62 can alternatively have an attachment structure configured to attach the attachment member 42 to the sleeve 46 of the movable member 42. FIG. 6 illustrates a non-limiting example of such an attachment structure. The interior wall 80 of the attachment member 62 can be configured to contact an exterior portion 88 of the sleeve 46 proximate the second end 50 of the sleeve 46. A clamp band 90 can surround the exterior surface 78 of the attachment member 62 proximate its second end 74. The clamp band 90 can be tightened with a clamp 92 to retain the attachment member 62 to the sleeve 46. The exterior portion 88 of the sleeve 46 can have one or more flexible fins 89 extending therefrom such that when the clamp 92 is tightened, the flexible fins 89 compress to provide a seal between the sleeve 46 and the attachment member 62. A gasket (not shown) may be positioned between the sleeve 46 and the attachment member 62 to ensure a secure fit and to eliminate squeak and rattle noise and/or may be positioned between the clamp 90 and the attachment member 62 to ensure a secure fit and to eliminate squeak and rattle noise.

FIGS. 5 and 6 also illustrate the location of the second end 50 of the sleeve 46 relative to the second end 74 of the attachment member 62. As described, the attachment member 62 can have a second end 74 larger than the first end 70. A transition portion 94 can be formed between the first and second ends 70, 74 that effectively properly positions the second end 50 of the sleeve 46 within the attachment member 62. As illustrated, the attachment member 62 can be funnel-shaped. The second end 50 of the sleeve 46 can be positioned proximate a neck portion 96 extending from the end of the transition portion 94 to the first end 70 of the attachment member 62. This provides a substantially constant diameter at the transitional areas to assist in feeding the wire harness 30 through the attachment member 62 and into the guide tube 26.

Figure 7:
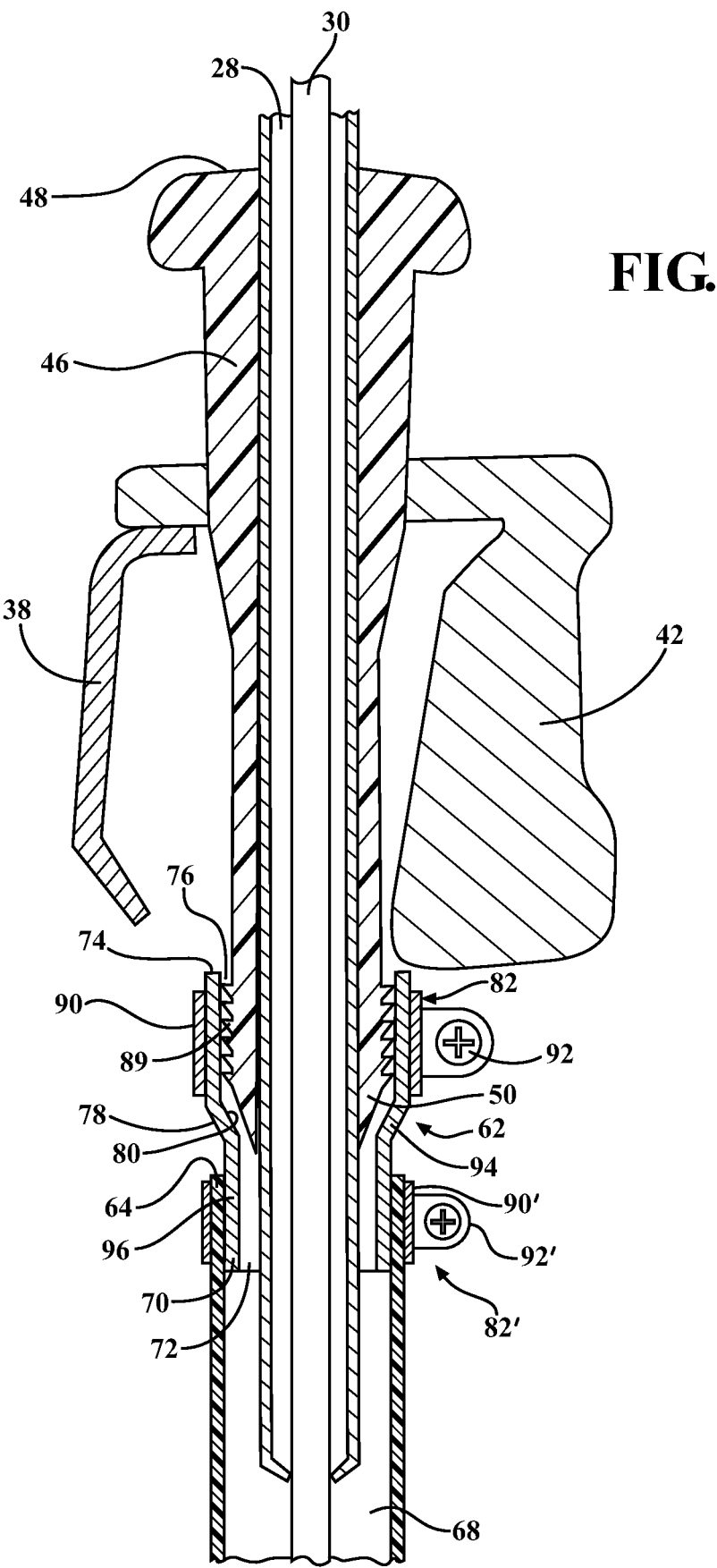
FIG. 7 is the enlarged view of FIG. 6 with a guide tube, seat back rod and wire harness included.

FIG. 7 shows the embodiment of FIG. 6 with the guide tube 26 attached to the attachment member 62 proximate its first end 70. The first end 70 of the attachment member 62 is sized to fit within the first open end 64 of the guide tube 26. An attachment structure 82' is configured to retain the guide tube 26 to the attachment member 62. As a non-limiting example, a clamp band 90' can surround the guide tube 26 where the guide tube 26 circumscribes the first end 70 of the attachment member 62. A clamp 92' can be used to tighten the clamp band 90' so that the guide tube 26 is retained on the attachment member 62. A gasket (not shown) may be positioned between the guide tube 26 and the attachment member 62 to ensure a secure fit and to eliminate squeak and rattle noise and/or may be positioned between the clamp 90' and the guide tube 26 to ensure a secure fit and to eliminate squeak and rattle noise. The first open end 64 of the guide tube 26 may be made of a more rigid material than the rest of the guide tube 26 to assist in retaining the guide tube 26 to the attachment member 62.

FIG. 7 also illustrates the headrest rod 28 extending into the sleeve 46 through its first end 48 and extending beyond the sleeve's second end 50 and beyond the attachment member's first end 70 to extend into the guide tube 26. The wire harness 30 extends beyond the headrest rod 28 and through the internal guide passage 68 of the guide tube 26, exiting the second end 66 of the guide tube 26, as shown in FIGS. 1B, 2A and 2B.

Figure 8:
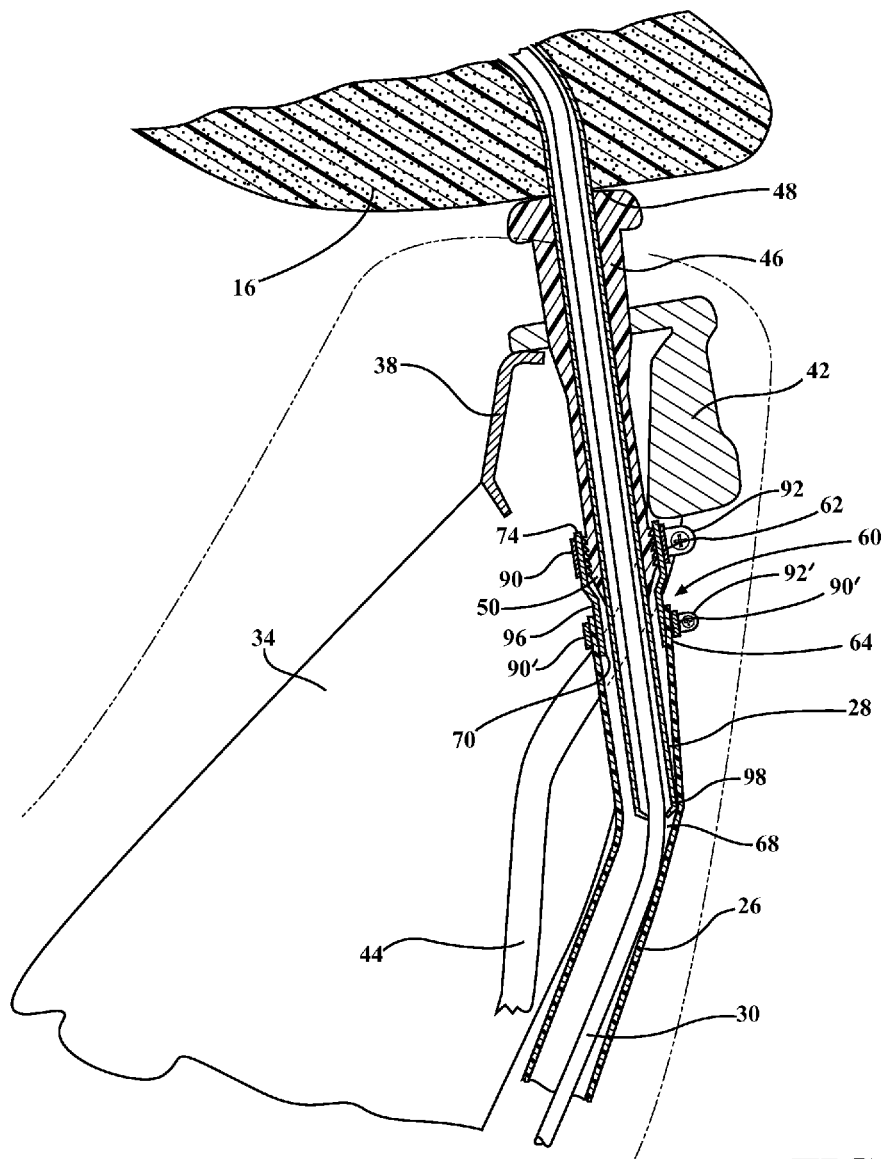
FIG. 8 is the cross-section view of FIG. 4 with the wire harness assembly in a forward position.

Referring back to FIG. 4, the wire harness assembly 40 is in the neutral position such that the head rest 16 is in the typical operational position. In this position, the guide tube 26 and the wire harness 30 extend through the seat back 14 experiencing slight curves formed by the contour of the seat back 14 and its internal mechanisms. FIG. 8 illustrates the wire harness assembly 40 in the forward position, resulting from pressure in the aft direction on the paddle 44. In this position, the head rest 16 moves in the forward direction along with the wire harness assembly 40. The headrest rod 28 is a rigid material. As illustrated, the distal end 98 of the headrest rod 28 puts pressure on the guide tube 26 when the head rest 16 is in the forward position. To prevent damage to the guide tube 26 and the wire harness 31, the flexible material of the guide tube 26 stretches with the distal end 98 of the head rest rod 28 so that the distal end 98 does not wear or damage the guide tube 26 in the area of contact over a period of time or the wire harness 30 does not wear in that area due to contact with a rigid guide tube.

Figure 9:
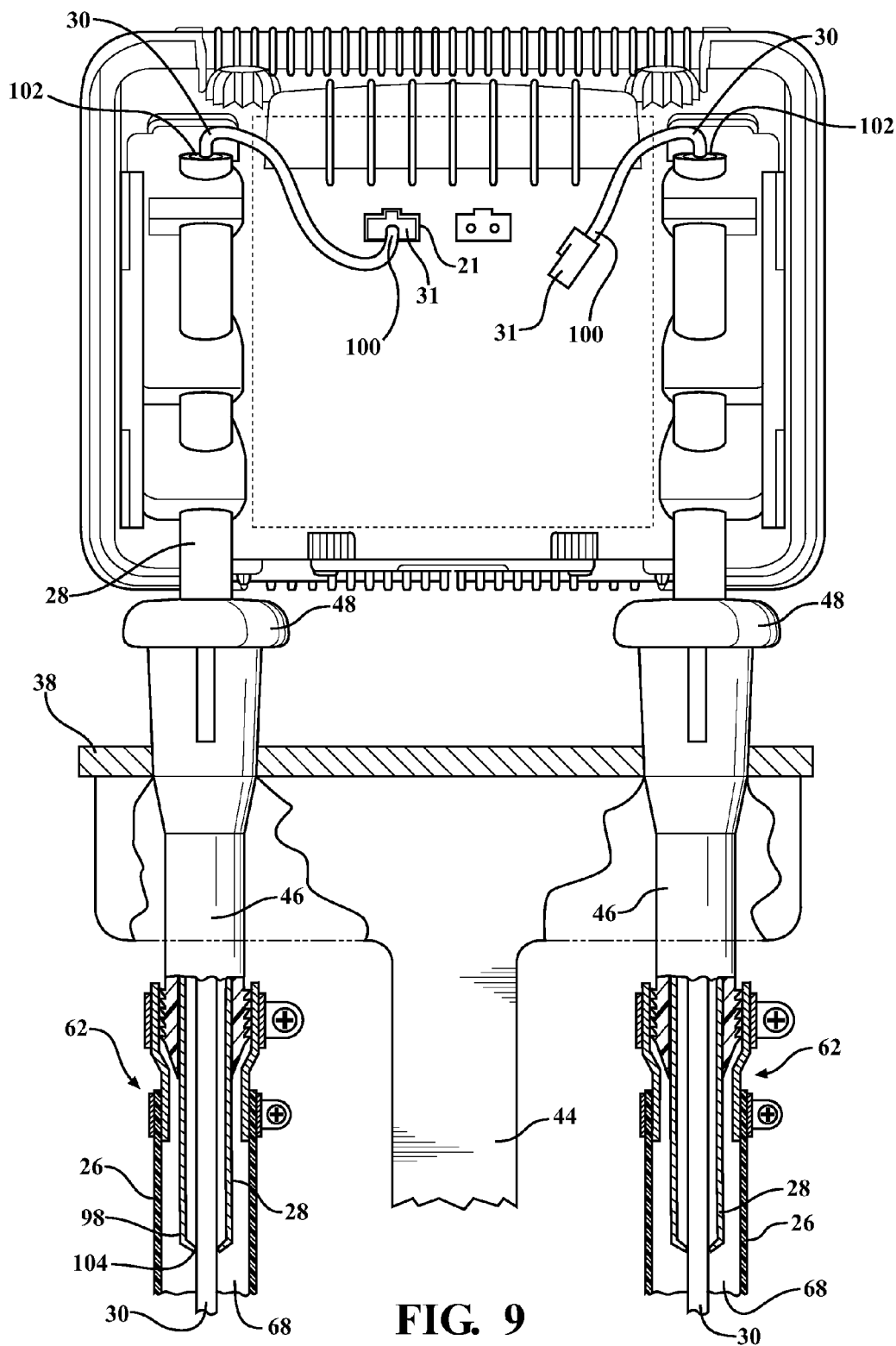
FIG. 9 is a front view showing the guide assembly and the interior of the headrest.

FIG. 9 shows the interior of the head rest 16 and the wire harness assembly 40. The wire harness 30 is provided with conventional connectors 31 and is connected to the electrical component 18 at a first end 100 of the wire harness 30 by one of the connectors 31. The connectors 31 may be received in complementary receptacles 21 that are formed on the electrical component 18 to electrically connect the wire harness 30 to the electrical component 18.

The first end 100 of the wire harness 30 is disposed within the headrest 16, where the wire harness 30 enters the first opening 102 of the headrest rod 28 and extends through the headrest rod 28, out the second opening 104 thereof, and into the seat back 14. If the size of the connectors 31 permits, the connectors 31 can be installed with respect to the wire harness 30 prior to installation of the wire harness 30 in the headrest rod 28. Otherwise, the wire harness 30 can be passed through the headrest rod 28 first via openings 102, and the connectors 31 can be installed to the first and/or second ends 100, 106 of the wire harness 30 prior to installation of the headrest 16 to the seat back 14.

The second end 106 of the wire harness 30 exits the guide tube 26 at the bottom end 22 of the seat back 14 at or near the exit aperture 24. Thus, the second end 106 of the wire harness 30 extends out of the exit aperture 24 for connection to the vehicle's electrical system using one of the connectors 31, either directly or by way of an extension wire harness (not shown). The guide tube 26 may also extend out of the exit aperture 24, or the guide tube 26 may terminate inside the seat back 14 proximate the exit aperture 24.

In use, the wire harness assembly 40 is connected to the vehicle seat 10 by connection of the movable member 42 to the upper member 38 of the seat frame 34. The attachment member 62 of the harness guide 60 is connected to the movable member 42 or to the sleeve 46 as with reference to FIGS. 5 and 6. The guide tube 26 is connected to the attachment member 62 as described with reference to FIG. 7. The headrest 16 is connected to the seat back 14 such that the headrest rod 28 extends through the sleeve 46 and attachment member 62 and into the guide tube 26. Wire harness 30 is threaded through an internal passageway of the headrest rod 28 and through the internal guide passage 68 of the guide tube 26 until the second end 106 of the wire harness 30 exits both the exit aperture 24 and the second end 66 of the guide tube 26. In this manner, the wire harness 30 may be routed through the headrest rod 28 and through the seat 10 using the wire harness assembly 40. Furthermore, the wire harness 30 may be installed subsequent to initial assembly of the seat 10 using the wire harness assembly 40, or the wire harness 30 may be easily replaced using the wire harness assembly 40.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A wire harness assembly for routing a wire harness through a vehicle seat back having an active head restraint system, comprising:

a movable member configured to move relative to a seat frame in a vehicle fore-aft direction, the movable member having a sleeve with a first end configured to receive a headrest rod of the active head restraint system and a second end opposite the first end;

a guide tube for a wire harness; and an attachment member connecting a first open end of the guide tube to the second end of the sleeve, wherein an upper end of the attachment member is attached to the second end of the sleeve and the a lower end of the attachment member is attached to the first open end of the guide tube, the guide tube having a guide passage that extends through the vehicle seat back from the first open end to a second open end, wherein the second end of the sleeve is located within the attachment member and configured such that the sleeve and the attachment member move with the movable member relative to the seat frame.

2. The wire harness assembly of claim 1, wherein the attachment member has an exterior wall, and wherein the exterior wall has a mounting structure configured to attach the attachment member to the movable member.

3. The wire harness assembly of claim 2, wherein the mounting structure comprises one or more projections extending from the exterior wall, and wherein the movable member defines one or more mounting apertures, with each of the projections configured to be received in a respective one of the mounting apertures in the movable member.

4. The wire harness assembly of claim 1, wherein the attachment member has a first end attached to the first open end of the guide tube with a first opening in communication with the first open end of the guide tube, and a second end having a second opening configured to receive the second end of the sleeve, the second opening being larger than the first opening.

5. The wire harness assembly of claim 4, wherein the attachment member has an attachment structure configured to attach the attachment member to the sleeve of the movable member.

6. The wire harness assembly of claim 5, wherein the attachment structure comprises an interior wall of the attachment member configured to contact an exterior portion of the sleeve and a clamp around the second end of the attachment member.

7. The wire harness assembly of claim 5, wherein the first end of the attachment member is sized to fit within the first open end of the guide tube.

8. The wire harness assembly of claim 1, wherein the guide tube is a flexible material.

9. A seat assembly for a vehicle, comprising:
a frame having an upper end and a lower end;
a seat back supported by the frame;
a headrest having a headrest rod that supports the headrest with respect to the seat back, wherein a first end of the headrest rod is disposed within the headrest, and a second end of the headrest rod is disposed outside the headrest and is receivable within the seat back at the upper end of the frame;
an electrical component that is disposed within the headrest and has a wire harness extending from the electrical component through the headrest rod;
a movable member coupled to the upper end of the frame, the movable member configured to move relative to the frame in a fore-aft direction of the vehicle;
a sleeve coupled to the movable member with a first end configured to receive the headrest rod and a second end opposite the first end; and
a harness guide including a guide tube and an attachment member that is connected to the guide tube and to the sleeve, the guide tube having a first open end and a second open end that is spaced apart from the first open end, and a guide passage that extends through the guide tube from the first open end to the second open end, wherein an upper end of the attachment member is attached to the second end of the sleeve and the a lower end of the attachment member is attached to the first open end of the guide tube, wherein, when received in the seat back, the second end of the headrest rod is located within the guide tube past the attachment member such that the headrest rod and the attachment member move with the movable member relative to the frame of the seat back, with the wire harness exiting the second end of the headrest rod within the guide tube and extending through the guide passage of the guide tube through the second open end.

10. The vehicle seat assembly of claim 9, wherein the seat back has an exit aperture, and wherein the guide tube is coupled to the frame with the first open end of the guide tube positioned proximate to the movable member and the second open end of the guide tube positioned proximate to the lower end of the frame, such that the guide tube guides the wire harness from the headrest rod to the exit aperture of the seat back.

11. The vehicle seat assembly of claim 9, wherein the attachment member has a first end attached to the first open end of the guide tube and a first opening in communication with the first open end of the guide tube, and a second end having a second opening configured to receive the second end of the sleeve, the second opening being larger than the first opening.

12. The vehicle seat assembly of claim 11, wherein the first end of the attachment member is sized to fit within the first open end of the guide tube.

13. The vehicle seat assembly of claim 11, wherein the first open end of the guide tube and the sleeve move with the movable member of the frame.

14. The vehicle seat assembly of claim 9, wherein the attachment member has an exterior wall, and wherein the exterior wall has a mounting structure configured to attach the attachment member to the movable member of the frame.

15. The vehicle seat assembly of claim 14, wherein the mounting structure comprises one or more projections extending from the exterior wall, and wherein the movable member defines one or more mounting apertures, with each of the projections configured to be received in a respective one of the mounting apertures in the movable member.

16. The vehicle seat assembly of claim 9, wherein the attachment member has an attachment structure configured to attach the attachment member to the sleeve.

17. The vehicle seat assembly of claim 16, wherein the attachment structure comprises an interior wall of the attachment member configured to contact an exterior portion of the sleeve, and a clamp around the second end of the attachment member.

18. The vehicle seat assembly of claim 9, wherein the guide tube is a flexible material.

19. The vehicle seat assembly of claim 18, wherein the guide tube is configured to stretch due to contact with the second end of the headrest rod during movement of the movable member.

20. The vehicle seat assembly of claim 9, wherein the seat back includes a foam structure having a guide tube receiving portion formed therein, and the guide tube is received within the guide tube receiving portion of the foam structure.

* * * * *